…

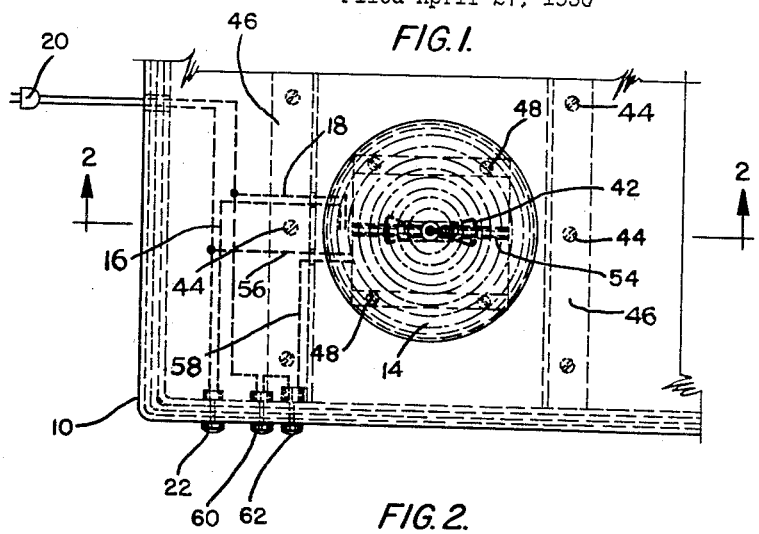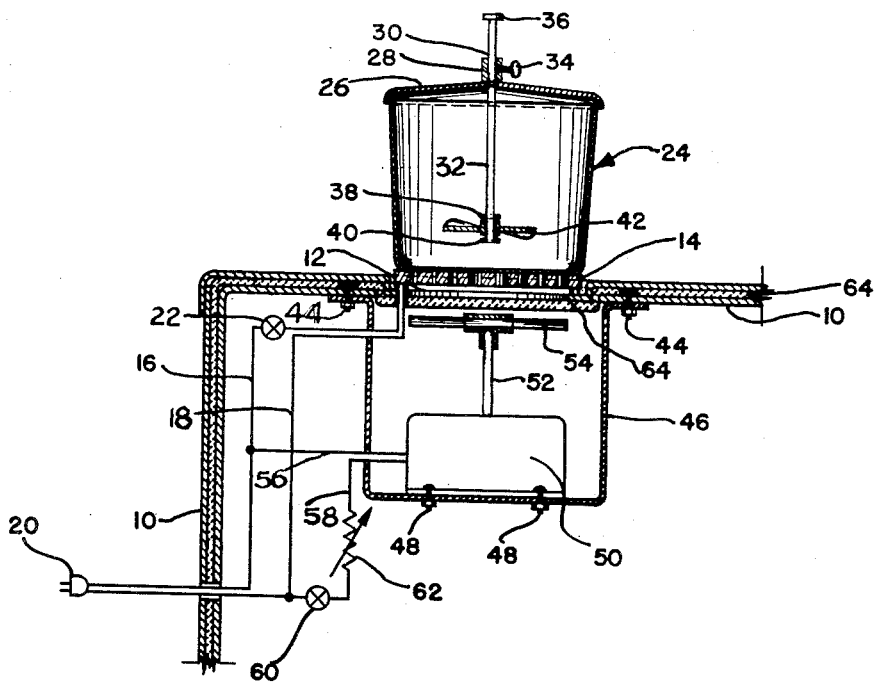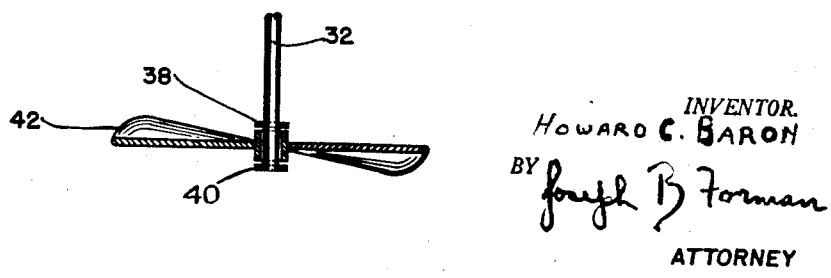

United States Patent Office 2,837,320
Patented June 3, 1958

2,837,320

MAGNETIC MIXERS

Howard C. Baron, Brooklyn, N. Y.

Application April 27, 1956, Serial No. 581,097

16 Claims. (Cl. 259—108)

This invention relates generally to devices for stirring a fluid in a container and more particularly to a magnetic mixer.

Often mixing or stirring operations must be carried out on a fluid while that fluid is being heated, but without permitting the entry of additional air into the container holding the fluid. The admission of such additional air may produce deleterious chemical effects upon the liquid which is in process of being agitated and heated.

It is therefore an object of this invention to provide an improved mixer which is magnetically operated in order to provide for the physical separation of the stirring element from its motive source of operation.

Another object of this invention is to provide an improved mixer which will operate effectively to stir a fluid which is being heated within a container or vessel without permitting additional air to enter the vessel.

Another object of this invention is to provide an improved heater and magnetic mixer having the source of its motive power and the source of its operative magnetic field protected by heat insulation.

A further object of this invention is to provide an economical, magnetic mixer which is simple in operation and easily accessible for servicing.

In the drawings, like reference characters designate the same parts in the several views.

Figure 1 is a plan view of a preferred embodiment of the invention.

Figure 2 is a vertical section taken along the line 2—2 of Figure 1.

Figure 3 is an enlarged perspective view of the stirring element shown in Figure 2.

In accordance with a preferred embodiment of the invention, an oven for the heating and magnetic mixing of a fluid is an air-sealed container. Set in a shallow depression 12 in the supporting structure is a heating element 14. The heating element may be of any type such as a gas burner or an electric heating element, but is shown in the preferred embodiment of the invention as an electric heating element having a pair of electrical conductors 16 and 18 leading to a male plug 20 for an outlet to a source of electric power not shown. The switch 22 controls the electric heating element.

The mixing vessel 24 is mounted over tthe heating element, preferably removably. The top cover 26 of the mixing vessel is removably fitted to the mixing vessel in such a manner as to seal it air tight when the cover is in position. Mounted over the center of the top cover is a collar 28 with a smooth round hole 30 machined therethrough and through the center of the top cover. Closely fitted to the hole in order to form an air seal, and extending therethrough vertically upward above the cover and vertically downward through and below the cover and into the mixing vessel is the slidable rod 32. The set screw 34, set within the collar, fixes the adjustable rod in position for the desired degree of immersion of the adjustable rod. The knob 36 affixed to the upper extremity of the adjustable rod is of assistance in controlling the degree of immersion of the said rod. Mounted at the lower extremity of the adjustable rod between the mounting studs 38 and 40 is the magnetizable, and freely rotatable stirring element 42. Although the stirring element may take any of the several forms, in order to obtain maximum agitation of any fluid which may be enclosed in the mixing vessel, the screw propeller form has been found to be preferable.

Bolted to the supporting structure by the bolts 44, directly under the heating element is the flanged mounting structure 46. Mounted on the mounting structure, preferably by antivibration mounts 48, directly under the heating element is the variable speed motor 50 having a vertical rotatable shaft 52. Fixedly mounted on the rotatable shaft at the upper extremity thereof is a magnet 54 capable of producing a strong magnetic field. This magnet may be an electromagnet, but for purposes of simplicity and economy is preferably a bar magnet of high permeability. A source of power, not shown, may be connected to the male plug 20 and fed through conductors 56 and 58 to the variable speed electric motor. Hooked into the conductor 58 are the "on-off" switch 60 and the variable speed control 62 for the electric motor.

A heat insulating lining 64, preferably of asbestos, affixed to the supporting structure under the heating element protects the magnet and the motor from injurious heat effects.

In actual operation the liquids to be mixed and heated are fed into the mixing vessel. The top cover is then tightly fitted into position. The variable speed motor is then switched "on." The adjustable plunger rod is then set for proper immersion to the degree which brings the stirring element within the magnetic field of the rotatable magnet. The length of the variable speed motor shaft is such that it brings the rotatable magnet as close as possible to the asbestos lining without frictional contact, thus enabling its magnetic field to operate with optimum effect on the stirring element. The heating element is then turned "on."

The composition of the fluid, its density and its temperature help to determine the desired degree of agitation of the fluid. This in turn is determined by the distance from the bottom, of the mixing vessel and the speed of rotation of the stirring element, which closely follows the rotatable magnet.

The stirring element may be a screw propeller having any number of blades. Two blades are preferable, however, for reasons of adequate efficiency of operation and of economy and simplicity in the structure of both the stirring element and the rotatable magnet.

This invention therefore in its preferred embodiment, as shown, and in its alternative forms, in accordance with the invention as described, provides an improved, simple, effective, economical device for heating and stirring the fluid contents of a mixing vessel without permitting the admission of additional air into the vessel.

What is claimed is:

1. In combination: a mixing vessel having a removable closure with an exterior surface and an interior surface; an adjustable rod mounted on said closure and having a first section of its length extending outward beyond the exterior surface of the said closure; and a second section of its length extending through the said closure and beyond its interior surface; a magnetizable stirring element freely rotatable in a selected plane, and rotatably mounted on the second section of the adjustable rod; a supporting structure for the mixing vessel; motive means having a rotatable shaft substantially colinear with the adjustable rod and mounted on the said supporting structure; and a magnet of high permeability fixedly mounted on the said rotatable shaft to rotate in a plane external to the mixing vessel and parallel and proximate to the said selected plane.

2. A magnetic mixer comprising: a supporting structure; motive means mounted on the said supporting structure and having a rotatable shaft; a rotatable magnet capable of producing a strong magnetic field, and fixedly mounted on the rotatable shaft; a movable mixing vessel adapted to being placed at least partially within the said magnetic field, and having a removable closure with an exterior surface and an interior surface; a rod mounted on said closure; extending away from the interior surface of said closure, and extending into the interior of the mixing vessel when the closure is in place; and a magnetizable, freely rotatable stirring element rotatably mounted on the rod and adapted to being magnetically rotated by the said rotatable magnet.

3. A magnetic mixer as described in claim 2 and wherein the motive means comprises a variable speed electric motor.

4. A magnetic mixer as described in claim 3 and wherein the magnetizable stirring element comprises a magnetizable two-bladed screw propeller.

5. A magnetic mixer comprising: a supporting structure; a heating element mounted on the supporting structure; a mounting structure affixed to the supporting structure and directly under the heating element; motive means mounted on the mounting structure and having a vertical rotatable shaft directly under the heating element; a rotatable magnet having a strong magnetic field and fixedly mounted to the vertical shaft at the upper extremity of the said shaft; a mixing vessel mountable to the supporting structure, over the heating element at least partially within the said magnetic field, and having a top cover with an interior surface and an exterior surface; a vertical rod mounted on the said top cover, and extending downward from the interior surface of the said top cover; and a magnetizable, freely rotatable stirring element rotatably mounted on the said vertical rod at its lower extremity within the magnetic field of the said magnet, and adapted to being magnetically rotated by the said magnet.

6. A magnetic mixer as described in claim 5 and wherein the heating element includes at least one electric heating coil.

7. A magnetic mixer as described in claim 5 and having a sheet of heat insulating material affixed to the supporting structure beneath the heating element for insulating the magnet and the motive means from the heating element.

8. A magnetic mixer as described in claim 5 and wherein the heat insulating material comprises an asbestos lining of the supporting structure.

9. A magnetic mixer as described in claim 6 and having a sheet of heat insulating material affixed to the supporting structure beneath the heating element for insulating the magnet and the motive means from the heating element.

10. A magnetic mixer as described in claim 6 and wherein the heat insulating material comprises an asbestos lining of the supporting structure.

11. A magnetic mixer as described in claim 10 and wherein the motive means comprises a variable speed electric motor.

12. A magnetic mixer comprising: a supporting structure; an electric heating element mounted on the supporting structure; a mounting structure affixed to the supporting structure and directly under the heating element; a variable speed electric motor mounted on the mounting structure and having a vertical, rotatable shaft directly under the heating element; a rotatable magnet having a strong magnetic field, and fixedly mounted on the vertical, rotatable shaft near the upper extremity thereof; an asbestos lining affixed to the supporting structure beneath the heating element for heat insulating the magnet and the variable speed electric motor from the heating element; a mixing vessel mounted on the supporting structure, over the heating element at least partially within the said magnetic field, and having a top cover with an interior surface and an exterior surface; and an adjustable, vertical rod mounted on said top cover, and having a first section of its length extending upward above the exterior surface of the said cover, and a second section of its length extending downward through the cover and below the interior surface of the said cover; and a magnetizable, freely rotatable stirring element rotatably mounted on the second section of the adjustable, vertical rod near the lower extremity thereof, and within the said strong magnetic field of the said rotatable magnet, and adapted to being rotated by the said rotatable magnet.

13. A magnetic mixer as described in claim 12 and wherein the rotatable magnet is a bar magnet of high permeability.

14. A magnetic mixer as described in claim 13 and wherein the stirring element comprises a magnetic, two-blade, screw propeller.

15. A magnetic mixer as described in claim 14 and wherein the mixing vessel is removably mounted on the supporting structure.

16. A magnetic mixer as described in claim 15 and wherein the top cover is removable.

References Cited in the file of this patent

UNITED STATES PATENTS

| | | |
|---|---|---|
| 2,275,266 | Meyer | Mar. 3, 1942 |
| 2,459,224 | Hendricks | Jan. 18, 1949 |
| 2,481,172 | Staggs | Sept. 6, 1949 |
| 2,518,758 | Cook | Aug. 15, 1950 |